UNITED STATES PATENT OFFICE.

LOUIS MONTALAND, OF VILLETANEUSE, FRANCE.

PROCESS FOR CONVERTING PINENE INTO CAMPHENE.

999,667.     Specification of Letters Patent.     Patented Aug. 1, 1911.

No Drawing.     Application filed May 3, 1910. Serial No. 559,156.

*To all whom it may concern:*

Be it known that I, LOUIS MONTALAND, citizen of the Republic of France, and resident of 105 Avenue de Saint-Denis, Villetaneuse, Seine, in the said Republic, chemist, have invented a new and useful Improved Process for Converting Pinene into Camphene, of which the following is a specification.

According to this invention, when vapor of pinene is brought into contact with a catalytic agent heated to a temperature between 200° and 300° C., it is converted into its isomeride camphene. The catalytic agent may be any of those which are known, more particularly alumina, silica, silicate of lime and alumina, kaolin, kieselguhr, clay, fullers' earth, red phosphorus, phosphate of alumina, or phosphate of lime. It is not necessary that the pinene should be in the form of vapor; it suffices to mix spirits of turpentine with a certain quantity of the catalytic agent and to heat the mixture to a temperature between 100° and 200° C. in order to realize the same transformation.

The following example illustrates the invention when alumina is the catalytic agent. In a cast iron boiler provided with a mechanical stirrer and with a reflux condenser, 1000 kilos of spirits of turpentine are heated to boiling in presence of 50 kilos of alumina prepared by precipitating sodium aluminate with an acid, washing the precipitate and drying it at a temperature of 300° C. Ten hours heating suffices for realizing the transformation of the pinene into camphene. This latter may be purified by distillation and crystallization.

Having now particularly described and ascertained the nature of my said invention and in what manner the same is to be performed, I declare that what I claim is:

1. A process for converting pinene into camphene by a simple catalytic action, which consists in causing a catalytic agent to act by its presence alone on spirits of turpentine in an anhydrous condition.

2. A process for converting pinene into camphene by a simple catalytic action, which consists in causing a catalytic agent to act by its presence alone on spirits of turpentine at a temperature varying between 100° and 300° C. in an anhydrous condition.

In testimony that I claim the foregoing as my invention, I have signed my name in presence of two witnesses, this twentieth day of April 1910.

LOUIS MONTALAND.

Witnesses:
    DEAN B. MASON,
    HENRY THIESSE.